US007123626B1

(12) United States Patent
Feyerabend (10) Patent No.: US 7,123,626 B1
(45) Date of Patent: Oct. 17, 2006

(54) FACILITATING DATA TRANSMISSION

(75) Inventor: Konrad Feyerabend, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1015 days.

(21) Appl. No.: 10/070,696

(22) PCT Filed: Aug. 16, 2000

(86) PCT No.: PCT/EP00/07957

§ 371 (c)(1),
(2), (4) Date: Jul. 17, 2002

(87) PCT Pub. No.: WO01/19110

PCT Pub. Date: Mar. 15, 2001

(30) Foreign Application Priority Data

Sep. 8, 1999 (EP) .................................. 99117675

(51) Int. Cl.
*H04J 3/16* (2006.01)
*H04J 3/22* (2006.01)
(52) U.S. Cl. ...................... 370/466; 370/467; 370/389; 370/328; 370/338; 370/392; 370/401; 370/475; 370/352; 709/245
(58) Field of Classification Search ............................... 370/395.5–395.54, 466, 467, 389, 328–338, 370/392, 401, 402, 403, 404, 475, 352; 709/220, 709/223, 226, 245
See application file for complete search history.

(56) References Cited

U.S. PATENT DOCUMENTS 5,796,728 A    8/1998 Rondeau et al. ............ 370/338

| | | | |
|---|---|---|---|
| 5,901,352 A | 5/1999 | St-Pierre et al. ............ | 455/426 |
| 6,137,791 A * | 10/2000 | Frid et al. .................... | 370/352 |
| 6,327,267 B1 * | 12/2001 | Valentine et al. ........... | 370/466 |
| 6,603,763 B1 * | 8/2003 | Koshino ....................... | 370/389 |
| 6,625,145 B1 * | 9/2003 | Winell .......................... | 370/389 |
| 6,839,339 B1 * | 1/2005 | Chuah .......................... | 370/349 |

FOREIGN PATENT DOCUMENTS

| | | |
|---|---|---|
| EP | 0578041 | 1/1994 |
| EP | 0851703 | 7/1998 |
| WO | WO 9917497 | 4/1999 |
| WO | WO 9937103 | 7/1999 |

OTHER PUBLICATIONS

International Search Report, International Application No. PCT/EP00/07957, Nov. 7, 2000 pp. 1-3.

* cited by examiner

*Primary Examiner*—Huy D. Vu
*Assistant Examiner*—Chuong T. Ho (57) ABSTRACT

The present invention provides a method, a system, a node in a communications system and a computer program facilitating a data transmission from a push service provider that addresses data by an Internet protocol address to a receiver which is identified in a communications system by a subscriber identity different to the IP address. The subscriber identity is determined by use of a first portion of the IP address for a look-up of a first portion of the subscriber identity, and by an assignment of a second portion of the IP address to a second portion of the subscriber identity. The invention can be used for different IP address formats like IPv4 and IPv6 addresses. The invention can be used in GSM/GPRS systems, PDC/PPDC and UMTS systems.

25 Claims, 9 Drawing Sheets

FACILITATING DATA TRANSMISSION

BACKGROUND

The present invention relates generally to communications systems, and, more particularly, to techniques and structures for facilitating data transmission to a receiver which is identified in a communications system by at least two different address types.

Already known by EP 0 851 703 A2 are a method and apparatus for alerting a receiver in one network about a communication request from a second network. In the case of a packet communication request, a gateway accesses a database to translate an IP address, which is associated with a mobile station as the receiver of the intended data transmission, to a subscriber identity of the mobile station. Then, the gateway requests a mobile switching centre to send an alert to the subscriber identity.

The usage of communications equipment, particularly mobile communications equipment, for transmission of data rather than speech has become increasingly popular by consumers. So-called pull services that are generally well known like Web-Browsing in the Internet, Home Banking and Electronic Shopping experience an increasing usage. Pull services have in common, that a user or a user's network initiates the individual service session set-up. E.g., a user connects via PC, laptop or mobile phone to an access server of an Internet Service Provider, to a banking computer or to an application server in order to establish the requested service session.

Also, so-called push services are increasingly demanded. Examples of such services are the generally well known News Ticker, Stock Market Information or Traffic Jam Announcements. Push services have in common, that an application server hosting the individual service application or the service application itself initiates the individual service session set-up. E.g., if a share on the stock market reaches a predefined limit, a service session can be set-up to notify a subscriber of the service.

Furthermore, it becomes more and more common to use the above described services not only via fixed networks but also via cellular communications systems like the Global System for Mobile Communication (GSM) or the Personal Digital Cellular (PDC) system. Today, such systems provide a circuit switched data service, which can be used to interconnect with external data networks. The circuit switched data service is used for both circuit switched as well as packet switched data communication.

To make packet switched data communication more efficient, new packet switched data services are introduced in cellular communications systems, like General Packet Radio Service (GPRS) as a part of GSM, or Packet Personal Digital Cellular (PPDC) as a part of PDC. Such packet switched data services will allow inter alia packet switched communications supported by a connectionless protocol like the Internet Protocol (IP). GPRS is a GSM service, and parts of the GSM infrastructure will be used. The same applies to PPDC as a PDC service, where parts of the PDC infrastructure will be used.

Usually, in today's cellular communications systems a subscriber is identified for the internal business of the system by a subscriber identity, e.g. by an International Mobile Subscriber Identity (IMSI) in GSM/GPRS and in PDC/PPDC. Inter alia, a system internal access to a subscriber profile and a locating of a subscriber is performed by use of such a subscriber identity. In contrast to this, in packet oriented communications networks that are based on the Internet Protocol (IP) both sender and receiver are identified by IP addresses. Therefore, in order to provide IP based packet switched data services cellular communications systems have to deal with two different address types, namely the IMSI and the IP address.

In the case of pull services applies a terminal originating scenario. The subscriber initialises a data session by sending a service request to a service provider, e.g. an application server, web server or bank computer. The service request is addressed by an IP address known by the subscriber that identifies the service provider. Alternatively and more convenient for the subscriber, the request can be addressed to a host name given in plain language. Then, a Domain Name Server (DNS) is used to lookup for a corresponding IP address that identifies the service provider, respectively the host. For details about the DNS, reference is made to Fred Halsall, 'Data Communications, Computer Networks and Open Systems', Addison-Wesley, $4^{th}$ edition 1997, pp. 758, 767, 816–820.

An Internet Protocol header comprises apart from the recipient's address also the sender's address in the IP address format. This sender's IP address can be assigned either statically or dynamically in the cellular communications system. E.g., the IP address can be statically stored in a read-only memory (ROM) of the mobile terminal, or it can be assigned from a pool of addresses dynamically on demand for one data session. Therefore, in the case of the pull service scenario, the communications system knows the subscriber's IP address, particularly for a certain data session. With this knowledge, the communications system can easily transmit data packets directed to the subscriber's IP address to the subscriber that are sent during the data session from the service provider.

In the case of a push service applies a terminal terminating scenario. A solution known from the state-of-the-art for offering push services is the use of the so-called Short Message Service (SMS). E.g., today's GSM systems offer SMS as a teleservice. SMS provides a point-to-point transmission of short text messages to or from a subscriber. Furthermore, it enables short text messages to be broadcast, e.g. at regular intervals, to all subscribers in a given geographical area. On the one hand, SMS provides an easy information delivery to a subscriber. On the other hand, SMS as a bearer for push services has some limits. The amount of data that can be transmitted by a short message is limited. Furthermore, IP based packet data sessions are not supported as such. The use of a gateway that converts IP based packet data to short messages causes some overhead and additional cost.

SUMMARY OF THE INVENTION

Therefore, it is an object of the present invention to provide an improved method and apparatus to facilitate push services in a cellular communications system, in particular to allow an efficient data transmission by use of co-existing different subscriber address types.

The solution described in the present invention allows the set-up of an IP based data session for an efficient and cost-effective provisioning of terminal terminating data services (push services), in particular in cellular communications systems. After receiving at a communications system a data packet that is sent from a service provider the system reads the IP address of the data packet. For an initiation of the data packet's payload information delivery to a receiver, the system determines a subscriber identity that identifies the subscriber to the communications system for its internal business. Advantageously, the existing infrastructure of circuit switching communication systems requiring the subscriber identity as an address type for a internal subscriber identification can be re-used also for packet switching extensions of these communications systems, although the subscriber identification is performed in data sessions via an IP address, which belongs to a different address type than the subscriber identity. Furthermore, neither a service provider nor a subscriber of an IP-based push-service has to care about the different addressing schemes because the method can be performed transparent to these parties by the communications system.

Furthermore, it is possible according to the present invention to process the steps of the method at a separate node that can be located either inside the cellular communications system or outside at the service provider's side. Therefore, the present invention supports a flexible architecture of the whole communications system.

An advantageous architecture that incorporates the present invention comprises a host that can provide a push service, a gateway node comprising means for performing the steps according to the method described in the present invention, an IP network connecting elements of the communications system, an address conversion node for the determination of the subscriber identity (SI) from a given IP address, a subscriber profile database that comprises subscriber profile data, and at least one receiver of payload information sent from the host. Such a distributed implementation of the present invention is especially useful, if one or more operators of the cellular communications system are also providers of the push services. In this case, a proprietary IP network can preferably be shared between these operators in their different roles. Furthermore, the present invention can advantageously be used for a transmission of data internally in the communications system. In this case, the receiver of payload information can be, e.g., a further network node of the communications system, and the payload information can be, e.g., signalling or control information. Such a scenario applies, if network nodes are identified internally in the communications system also by a subscriber identity, wherein the transmission of data from one a network node to another network node is based on an Internet Protocol and is performed via the internal IP network. Therefore, the architecture proposed by the present invention supports an efficient usage of the system resources.

The invention is preferably realised by a computer program that is loadable into the internal memory of a digital computer, which can be advantageously comprised, e.g., in a network node of the communications system, in a computer simulator for testing purposes or also in a mobile terminal. The computer program comprises software code portions that are adapted to perform the steps of the method, which is proposed by the present invention, when the program is run on a computer. The term 'computer program' in the sense of the present invention includes also the meaning of 'computer program product'.

Preferably, the subscriber identity is determined by a lookup of a first portion of the IP address in a lookup table, resulting in a first portion of the subscriber identity. A second portion of the subscriber identity is assigned according to a second portion of the IP address. Therefore, a huge amount of data overhead is avoided, because the lookup table does not need to contain all IP addresses, which have got a corresponding subscriber address. Instead, only a small lookup table can be used to retrieve a relevant subscriber identity address part. In other words, due to the strong relation between subscriber identity and IP address that is incorporated by the steps of lookup and assignment the operator of the cellular communications system can easily implement a bijective rule for the determination of a subscriber identity from a given IP address and vice versa, instead of costly maintaining two different numbering schemes, namely a subscriber identity scheme and an IP address scheme. As a further advantageous result of the embodiment, the time required for the determination of the subscriber identity is lower by use of the proposed small lookup table in contrast to a separate numbering scheme maintained in a database. This leads to a reduced set-up time for a data session furthermore, memory space and processing time is saved or in other words, the available resources can be used efficiently and cost-effective.

In a further preferred embodiment of the present invention the subscriber identity is the International Mobile Subscriber Identity (IMSI). The IMSI is a mobile station identifier uniquely identifying a mobile station internationally. The structure of the IMSI is standardised by the International Telecommunication Union (ITU). In contrast to proprietary numbering schemes for the subscriber identity, the standardised IMSI supports operators of cellular communications systems in a sharing of the same IP backbone network.

In a further preferred embodiment of the present invention a further address information of the receiver is determined. The further address information can comprise, e.g., information from the subscriber's user profile record kept in the cellular communications system and/or location information about the current location of the subscriber. It is useful to determine on demand, i.e. in the case of a communications request, additional current delivery information like the address of an appropriate base station, which can reach the mobile subscriber, instead of tracking and keeping these information always up-to-date in the system.

In a further preferred embodiment of the present invention the IP address is stored together with the subscriber identity and/or the further address information in a buffer. Therefore, the determination of the subscriber identity and/or the further address information can advantageously be performed only once for a data session. There is no need to determine such information again for each individual data packet, which belongs to the data session.

In a further preferred embodiment of the present invention the subscriber identity and/or further address information stored in a buffer are used to initiate the delivery of the data packet's payload information to the subscriber. Therefore, the delivery time of data is decreased due to the renunciation of further individual determination of the subscriber identity and/or the further address information for each individual data packet that belongs to the data session. Furthermore, a significant amount of processing time and resources can be saved.

In a further preferred embodiment of the present invention the IP address of received data packets has an IPv4 or IPv6 format. Advantageously, these IP address formats are or will be supported by a wide range of commercially available routers, which can efficiently be used to build up the IP network, instead of developing proprietary routers for data traffic addressed by a proprietary IP address format causing extra costs.

In a further preferred embodiment of the present invention the given division of the IP address in network identifier and host identifier is used for the mapping of the first and second portion of the subscriber identity. Advantageously, there is no need for a proprietary division of the IP address into two portions for an assignment to two portions of the subscriber identity.

In a further preferred embodiment of the present invention the IPv4 address is encoded in a so-called Class A format. Therefore, there is one byte available for the network identifier providing 256 different Class A networks, and there are 3 bytes available for host identifiers. In this way, one Class A network can cover up to $2^{24}$ subscribers. In addition, the lookup table used for the retrieving of the first portion of the subscriber identity comprises a maximum of 256 entries only, which leads to a good performance regarding to the needed lookup time. If a prefix bit is used to mark the used network class, a maximum of 128 entries for the look-up table is available. The Class A format of the IPv4 address is in particular useful, if the IMSI is used as subscriber identity. There are countries like Japan, which use 6 digits of the IMSI as a Mobile Station Identification Number (MSIN), which is a part of the IMSI. These 6 digits can easily be represented by the 3 bytes of the host identifier. The use of such well-defined structures for the translation rule of an IP address into a subscriber identity is more efficient than the use of a proprietary structure.

In a further preferred embodiment of the present invention the subscriber identity is the mobile station integrated services digital network number MSISDN. The MSISDN is a mobile subscriber identifier uniquely identifying a mobile subscriber internationally. The structure of the MSISDN is standardised by the International Telecommunication Union (ITU). In contrast to proprietary numbering schemes for the subscriber identity, the standardised MSISDN supports operators of cellular communications systems in a sharing of the same IP backbone network.

In a further preferred embodiment of the present invention the host of the communications system is connected via a firewall to a further network like the Internet. Advantageously, this allows the service provider to offer also external data services, wherein at the same time data security and protection against hackers and computer viruses can be provided.

In a further preferred embodiment of the present invention the host comprises an application server, which can provide inter alia push services. This is especially useful, if the operator of the cellular communications system is in unity also the service provider. Therefore, data services can be offered without the need to connect to external networks.

In a further preferred embodiment of the present invention the subscriber profile database (HLR) comprises the address conversion node for determining of at least one portion of the subscriber identity from at least one portion of the IP address. The subscriber identity is used in the cellular communications system to retrieve subscriber data from the subscriber profile database (HLR). These data are necessary for a delivery of payload information to the subscriber. Therefore, an address conversion node integrated in the subscriber profile database can reduce the amount of signalling necessary for a data session set-up.

In another preferred embodiment of the present invention the gateway node of the cellular communications system comprises the address conversion node. Also in this way the amount of signalling can be reduced compared to an architecture with a separate address conversion node.

In a further preferred embodiment of the present invention the communications system comprises a PPDC system or a GPRS system or a UMTS system. In particular these systems allow an easy implementation of the present invention.

In a further preferred embodiment the computer program is stored on a computer readable medium like a floppy disk or a CD ROM. This is especially useful for a transfer of the computer program, which is necessary, e.g., if it is created, tested or compiled on a computer that is different to the target computer.

BRIEF DESCRIPTION OF THE DRAWINGS

In the following detailed description preferred embodiments of the present invention will be described with reference to the accompanying drawings, wherein.

DETAILED DESCRIPTION OF THE INVENTION

Figure 1:
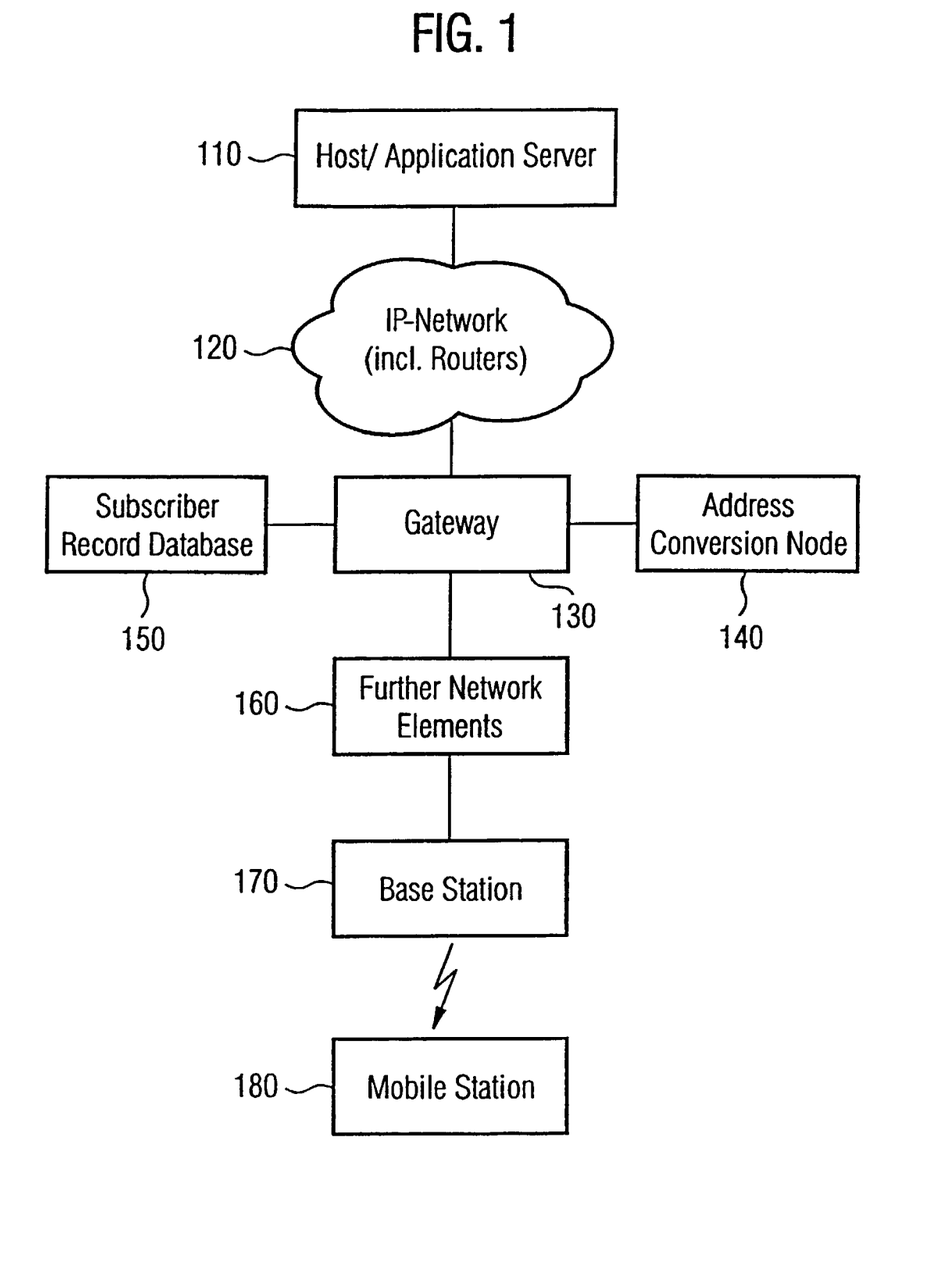
FIG. 1 illustrates a simplified block diagram of an exemplary communications system.

A communications system performing data transmission to a receiver, which is identified in the system by at least two different address types, is exemplary represented in FIG. 1. It comprises a host 110, which is connected to an IP network 120. The host comprises one or more application servers. The application server runs one or more applications providing one or more push services. The host, respectively the application server, uses a packet-oriented protocol like the Internet protocol in order to send information to a receiver identified by an IP address. The receiver according to FIG. 1 is a mobile station 180.

However, the present invention is not limited to a host or an application server as a sender of data packets. Instead, data can be sent, e.g. from a mobile station or another element belonging or related to the communications system. In a further preferred embodiment of the present invention the host 110 is connected, preferably via a firewall, to the Internet (not shown in FIG. 1). In this case, the host 110 is an intermediate sender of data packets transmitted from another host or application of the Internet. The firewall can provide protection against any unauthorised access, in particular against viruses and hackers.

The IP network 120 comprises at least one router for router data packets. The IP network can be a proprietary network of one operator, a network operated with a fixed number of operators or a network with a flexible number of operators. In the latter case the IP network can also be a so-called sub-network of the Internet.

A gateway 130 is connected to the IP network 120. This gateway receives data packets, which are addressed to the mobile station 180 by use of an IP address. In order to locate the mobile station 180, and in order to transmit at least payload information of data packets to the mobile station 180, the communications system needs to determine from the given IP address a subscriber identity SI, which identifies internally in the communications system a mobile subscriber and/or the mobile station.

An address conversion node 140, which is connected to the gateway 130, performs the conversion of the IP address into the subscriber identity SI. With this subscriber identity SI the gateway 130 inquires a subscriber record database 150 which is connected to the gateway in order to retrieve further address information about the receiver, respectively the mobile station 180 and/or the mobile subscriber. With this further address information the gateway triggers further network elements 160 to locate the receiver and to transmit at least payload information of the data packet to the base station 170 for a further transmission to the receiver, respectively the mobile station 180. Therefore, at least one element of the further network elements 160 is connected to the gateway 130, and at least one element of the further network elements 160 is connected to the base station 170.

In a further preferred embodiment of the present invention (not shown in FIG. 1), transmission of both payload information and signalling information between the network elements of the communications system is performed by the IP network 120. In other words, all network elements like the host 110, the gateway 130, the address conversion node 140, the subscriber record database 150, further network elements 160 the base station 170 and other base stations are connected to the IP network 120.

FIG. 1 shows an architecture appropriate for a cellular communications system. The receiver of the payload information sent from a push service and provided by the application server is a mobile station 180. Alternatively, the receiver can be also a terminal in a fixed network, a PC or a laptop connected to the mobile station, or any other device connected to the communications system like a refrigerator. In other words, each device, which can be identified by an IP address, and which is connected to the communications network is an appropriate receiver of data information sent from a push service.

In an alternative embodiment of the architecture the gateway 130 can comprise the address conversion node 140. In another embodiment of the present invention the subscriber record database 150 can comprise the address conversion node 140. In general, the address conversion node 140 can be located either as a separate node in the communications system, or it can be comprised in any other node of the system.

Figure 2:
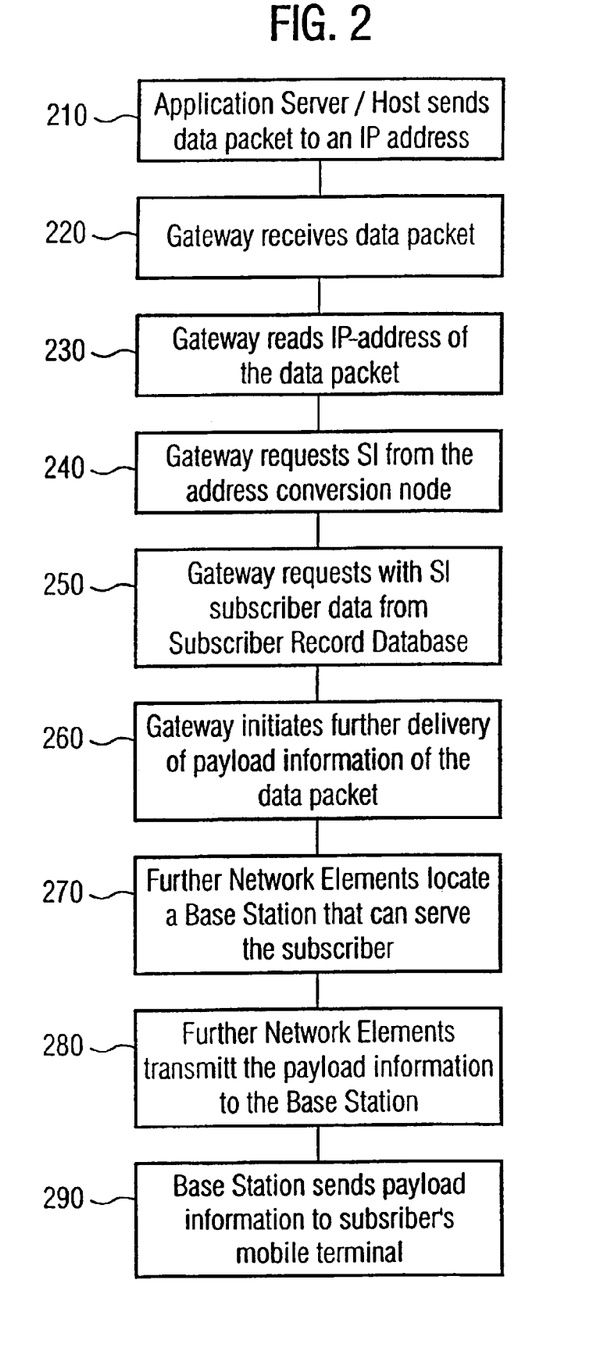
FIG. 2 illustrates in a flow chart an exemplary set-up of a mobile terminated data session.

FIG. 2 shows an exemplary set-up of a mobile terminated push service data session. An application server, respectively a host sends a data packet to an IP address 210. A gateway of the communications system receives the data packet 220. After reading the IP address of the data packet 230, the gateway requests by use of the IP address a subscriber identity SI from the address conversion node 240. With this subscriber identity SI available, the gateway requests further subscriber data from a subscriber record database 250. In the next step, the gateway initiates a further delivery of payload information of the data packet 260. This is done by use of the further subscriber data. These data allow further network elements in the next step 270 to locate a base station that can serve the subscriber. Then, further network elements transmit the payload information to the located base station 280. This base station sends the payload information to the subscriber's mobile terminal 290.

In order to deliver push service payload data to subscriber's mobile terminal, the payload of one or more data packets sent from the host, respectively the application server, is read by a network node of the communications system, preferably by the gateway. Then it is transmitted to the receiver, respectively the subscriber's mobile terminal, either by use of a circuit-oriented protocol or by use of a packet-oriented protocol. In a further embodiment of the present invention instead of only payload, whole data packets sent from the host or an application server are further transmitted to the receiver. This can be done either via a separate IP backbone network or by means of the IP network 120 according to FIG. 1. In the latter case, apart from the host 110 and the gateway 130 other key elements of the communications network necessary for such a transmission are connected to the IP network as explained above. In order to transmit a whole data packet to the appropriate receiver the data packet can be encapsulated in another data packet, which is addressed to the appropriate base station responsible for the delivery of information over the air interface to the mobile station. Alternatively, the IP address of the data packet which is sent from the application server, respectively the host, can be changed to the IP address of the base station or the appropriate network node, which delivers the information to the subscriber.

The communications system outlined in the figures, especially in FIG. 1, is well suited for packet PDC systems, GPRS systems and for UMTS. However, the invention is not limited to implementations with these systems. The invention can be used in all systems, in which data packets that are addressed to a receiver's IP address are transported internally in the system to the receiver by use of a subscriber identity SI, or in general, by use of an address of a type different to the IP address.

Figure 3A:
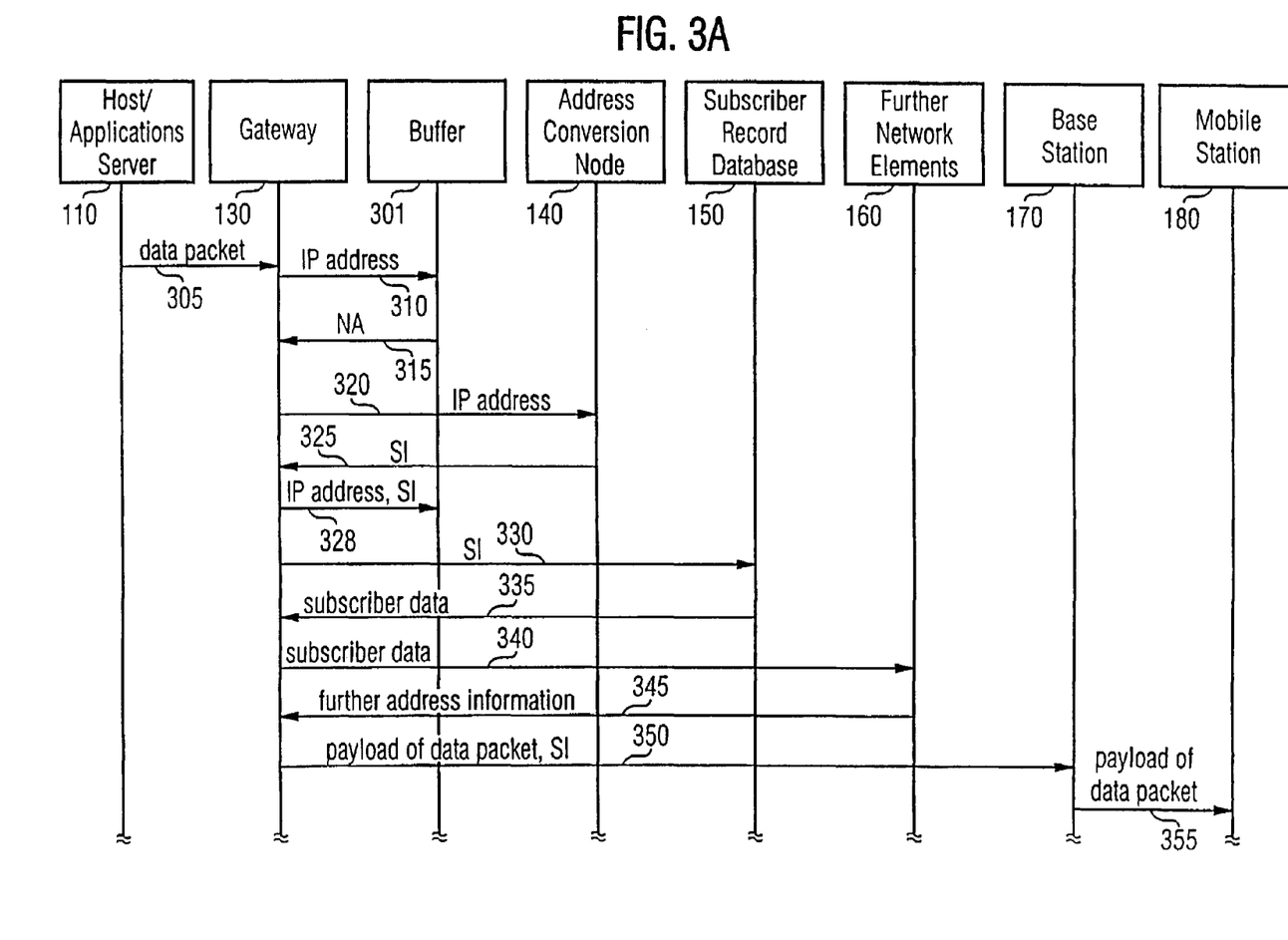
FIG. 3 illustrates in a message sequence chart a simplified exemplary data transmission from a host or an application server to a mobile station.
Figure 3B:
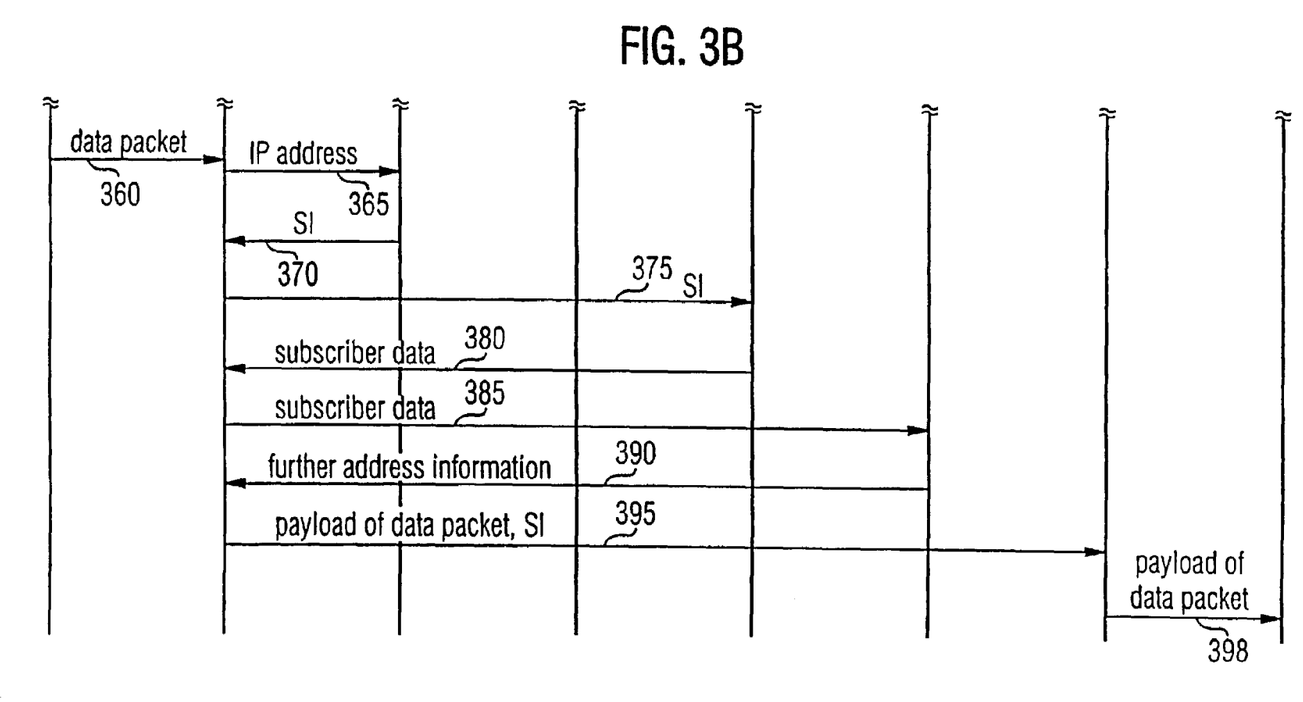

A simplified exemplary data transmission from a host and/or an application server to a mobile station is illustrated as a message sequence chart in FIG. 3. In a first step 305, a data packet is sent from a host or an applications server 110 to a gateway 130. The gateway tracks in the next step 310 whether a subscriber identity SI that belongs to the IP address is stored in a local buffer 301 of the gateway. If the subscriber identity is not available at the local buffer a negative acknowledgement is sent back 315 to the gateway. Then, the gateway requests 320 by use of the IP address the subscriber identity SI from the address conversion node 140. After receiving 325 of the subscriber identity SI from the address conversion node, the gateway sends 328 the IP address and a corresponding subscriber identity SI to the local buffer. This allows later on if further data packets for the same receiver are received during the data session an easy look-up of the subscriber identity.

In a next step 330 the subscriber identity SI is sent to the subscriber record database 150 in order to retrieve 335 subscriber data. These subscriber data can comprise, e.g., location information, roaming information and/or charging information. The subscriber data are used by the further network elements 160 in order to determine the appropriate base station 170, which can send information to the receiver's mobile station 180.

Therefore, the gateway 130 sends in the next step 340 the subscriber data to further network elements 160 and retrieves 345 further address information. These further address information can be, e.g., an internal address of a base station 170, which is capable to reach the mobile station 180 of the subscriber. In the next step 350 the gateway 130 sends the payload data information of the data packet to the base station 170 which sends further 355 the payload information to the mobile station 180. In addition (not shown in FIG. 3), also the subscriber identity SI and/or the IP address can be transmitted from the gateway 130 to the mobile station 180 for a further use.

A payload delivery of further data packets belonging to the same data session, i.e. data packets addressed to the same IP address as a first data packet of the data session, makes use of the buffered subscriber identity SI. As shown in FIG. 3, after receiving of such a further data packet sent 360 from the host or application server 110 to the gateway 130, the gateway sends 365 the IP address to the buffer, and receives 370 the corresponding subscriber identity SI. With this subscriber identity, further steps necessary for the delivery of at least the data packet's payload information are performed. I.e., in step 375 the gateway 130 sends the subscriber identity SI to the subscriber record data base 150 and retrieves 380 subscriber data. Then, it sends 385 subscriber data to further network elements 160 in order to retrieve 390 further address information. In the next step 395, at least the payload of the further data packet is sent, preferably together with the subscriber identity and/or the IP address to the base station 170, which transmits 398 these information to the mobile station 180.

Figure 4A:
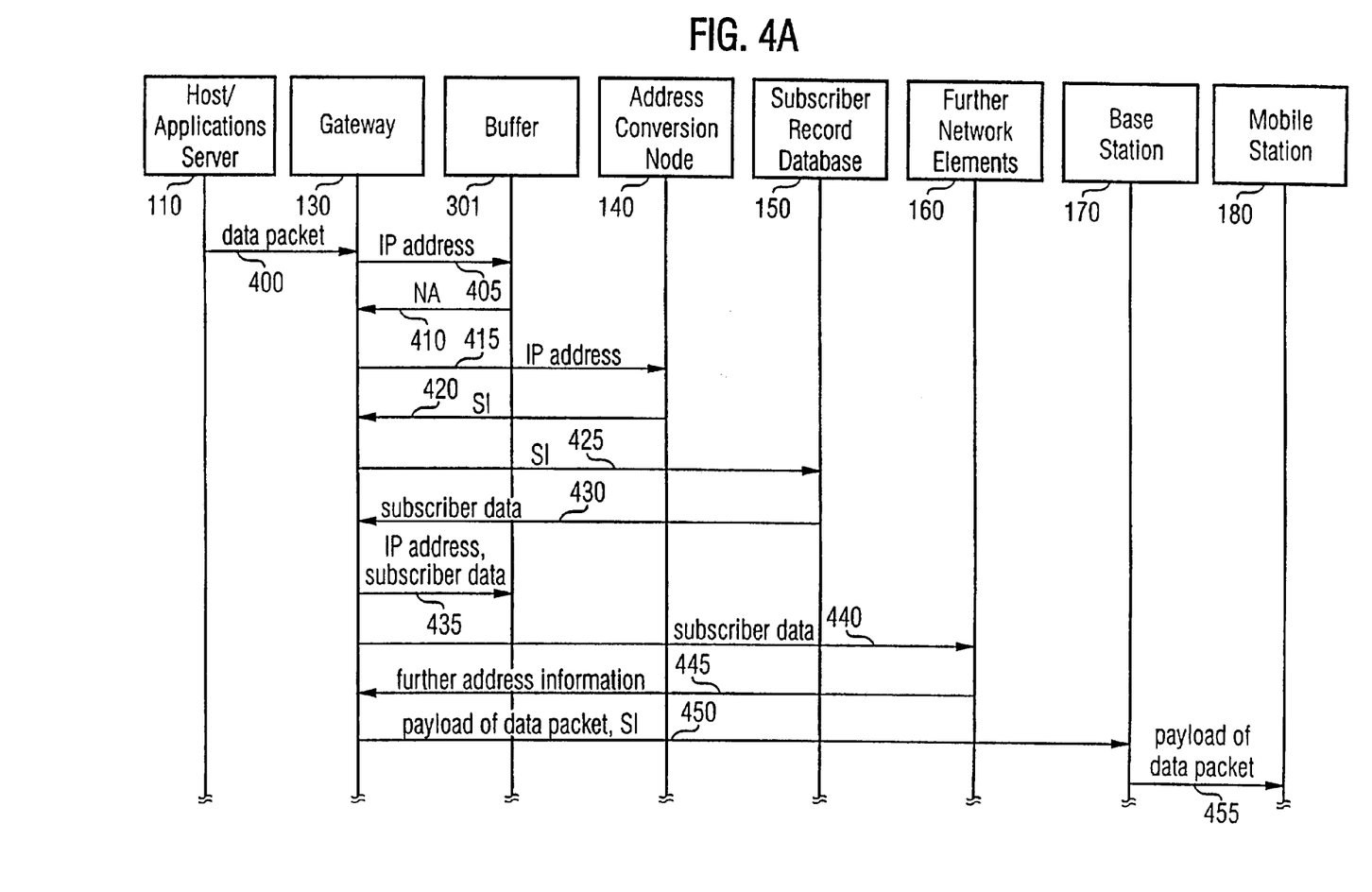
FIG. 4 illustrates in a message sequence chart another simplified exemplary data transmission from a host or an application server to a mobile station.
Figure 4B:
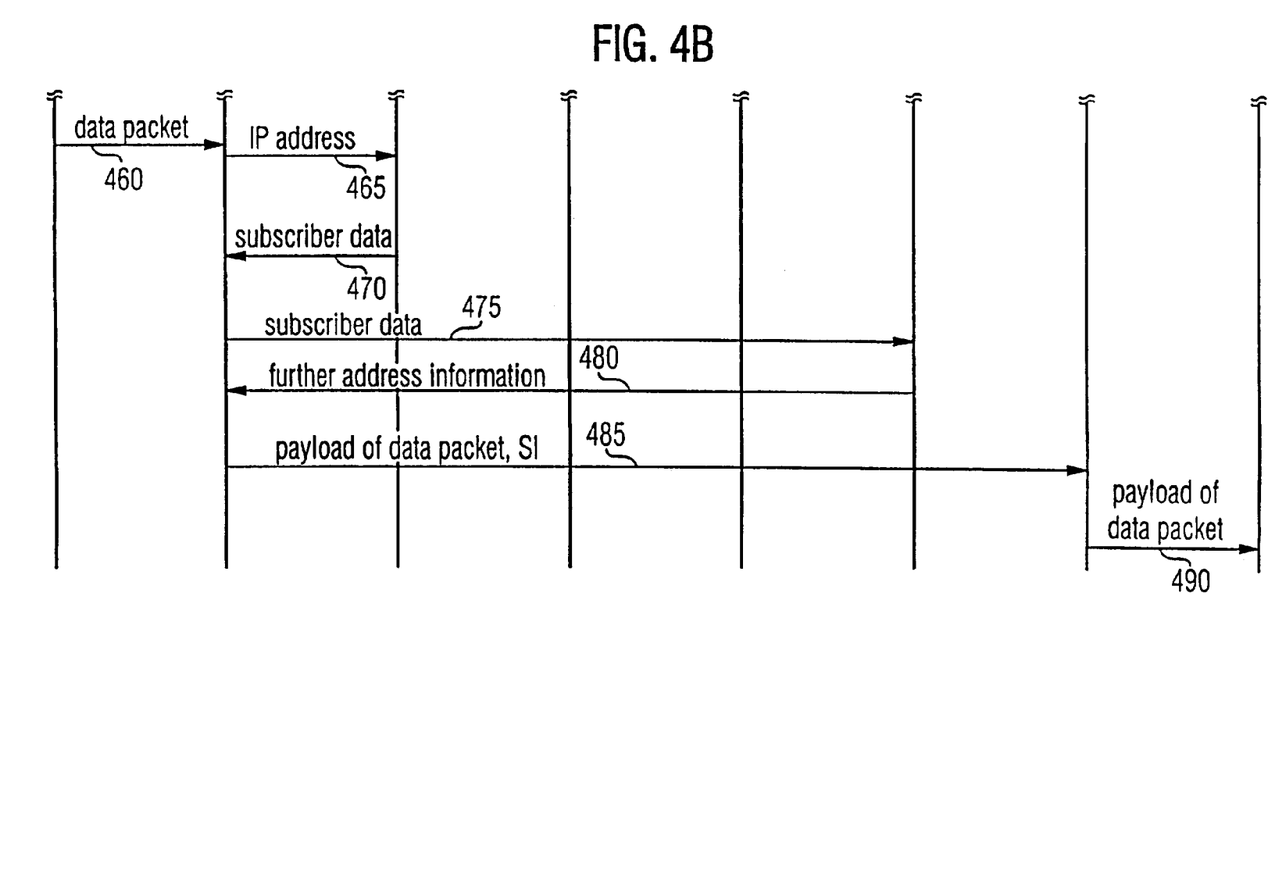
Figure 5A:
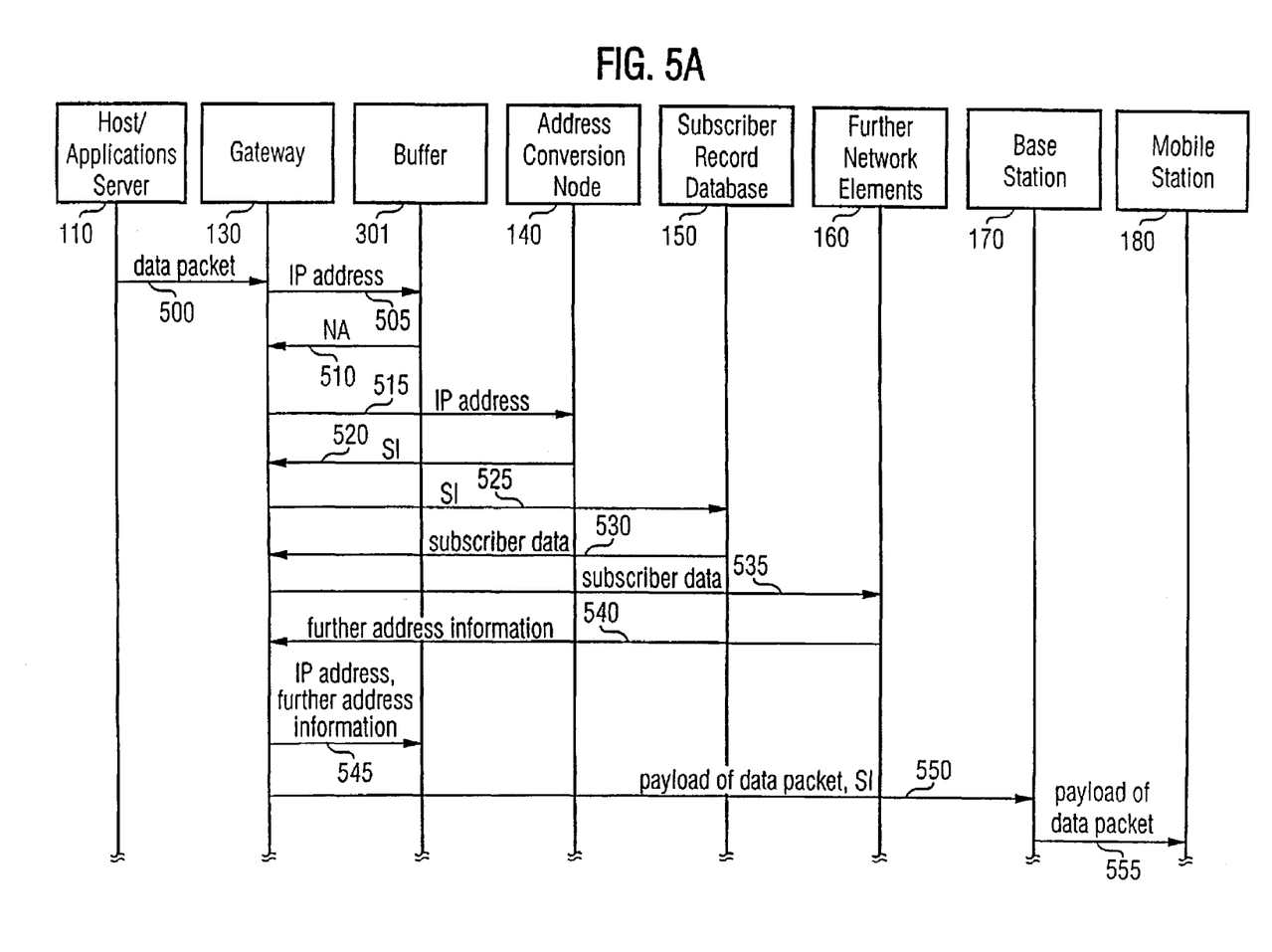
FIG. 5 illustrates in a message sequence chart another simplified exemplary data transmission from a host or an application server to a mobile station.
Figure 5B:
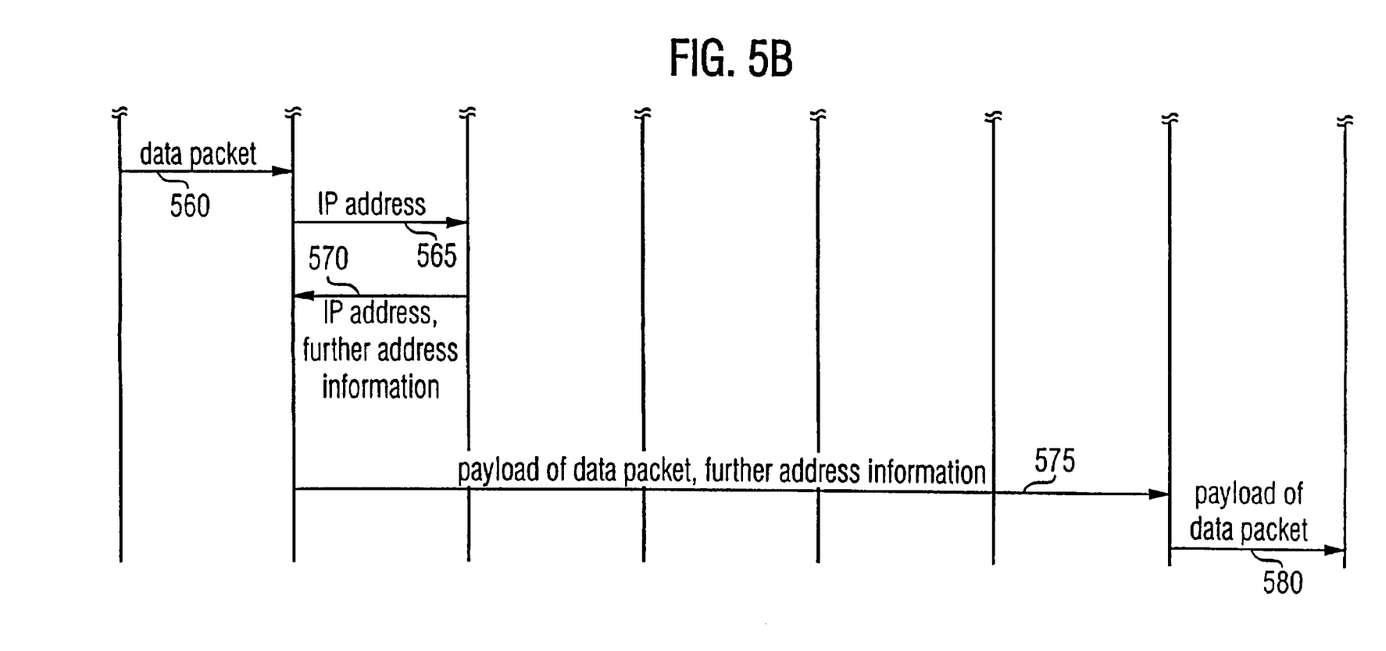

The message sequence chart in FIG. 3 as well as the charts in the following FIGS. 4 and 5 are simplified with regards to the determination of the mobile station's location, which is not an object of the present invention. Nevertheless, a person skilled in the art knows the details of the appropriate methods and messages for the individual systems from the corresponding standards and/or other literature. E.g., for the GSM system reference is made to Mouly, Pautet 'The GSM System for Mobile Communications'. Rather, apart from the retrieval of subscriber data from the subscriber record database, the invention can also be used transparent to the cellular part of the communications system.

FIG. 4 illustrates a further preferred embodiment of the present invention by a sequence chart of another simplified exemplary data transmission from a host and/or an application server to a mobile station. In a first step 400, a data packet is sent from a host or an applications server 110 to a gateway 130. The gateway tracks in the next step 405 whether subscriber data that belong to the subscriber's IP address are stored in a local buffer 301 of the gateway. If subscriber data are not available at the local buffer a negative acknowledgement is sent back 410 to the gateway. Then, the gateway requests 415 by use of the IP address the subscriber identity SI from the address conversion node 140. After receipt 420, the subscriber identity SI is sent 425 to the subscriber record database 150 in order to retrieve subscriber data. After receiving 430 of the subscriber data from the subscriber record data base, the gateway sends 435 the IP address and the corresponding subscriber data to the local buffer. This allows later on if further data packets for the same receiver are received during the data session an easy look-up of the subscriber data.

The gateway 130 sends in the next step 440 the subscriber data to further network elements 160 and retrieves 445 further address information. As explained above, these further address information can be, e.g., an internal address of a base station 170, which is capable to reach the mobile station 180 of the subscriber. In the next step 450 the gateway 130 sends the payload data information of the data packet to the base station 170 which sends further 455 the payload information to the mobile station 180.

A payload delivery of further data packets belonging to the same data session makes use of the buffered subscriber data. As shown in FIG. 3, after receiving of such a further data packet sent 460 from the host or application server 110 to the gateway 130, the gateway sends 465 the IP address to the buffer, and receives 470 the corresponding subscriber data. With this subscriber data, further steps necessary for the delivery of at least the data packet's payload information are performed as explained above. I.e., in step 475 the gateway 130 sends the subscriber data to further network elements 160 in order to retrieve 480 further address information. In the next step 485, at least the payload of the further data packet is sent, preferably together with the subscriber identity and/or the IP address to the base station 170, which transmits 490 these information to the mobile station 180.

FIG. 5 illustrates a further preferred embodiment of the present invention by a sequence chart of another simplified exemplary data transmission from a host and/or an application server to a mobile station 180. In a first step 500, a data packet is sent from a host or an applications server 110 to a gateway 130. The gateway tracks in the next step 505 whether further address information about the receiver identified by the IP address are stored in the local buffer 301. If further address information is not available a negative acknowledgement is sent 510 from the buffer to the gateway. Then, the gateway requests 515 by use of the IP address the subscriber identity SI from the address conversion node 140. After receipt 520, the subscriber identity SI is sent 525 to the subscriber record database 150 in order to retrieve 530 subscriber data. By use of the subscriber data, the gateway requests 535 further address information of the mobile station 180 from further network elements 160. After receiving 540 of the further address information, the gateway sends 545 the IP address and the corresponding further address information to the local buffer. This allows later on if further data packets for the same receiver are received during the data session an easy look-up of the further address information. In the next step 550 the gateway 130 sends the payload data information of the data packet to the base station 170 which sends further 555 the payload information to the mobile station 180.

A payload delivery of further data packets belonging to the same data session makes use of the buffered further address information. After receiving of such a further data packet sent 560 from the host or an application server 110 to the gateway 130, the gateway sends 565 the IP address to the buffer, and receives 570 the corresponding further address information. In the next step 575, at least the payload of the further data packet is sent, preferably together with the subscriber identity and/or the IP address to the base station 170 identified by the further address information. This base station transmits 580 the payload information to the mobile station 180.

In the following, the determination of a subscriber identity SI from a given IP address as it takes place, e.g., at the address conversion node of the communications system is explained in detail. In general, the determination of the subscriber identity makes use of a division of the IP address into two portions. A first portion of the IP address is used to retrieve by a look-up in a look-up table a first portion of the subscriber identity SI. A second portion of the IP address is assigned to a second portion of the subscriber identity SI.

Although proprietary address formats of the IP address and the subscriber identity SI can be used in the present invention, there are standard formats available, which are widely used in today's commercially available communications systems. These standard formats support by their structure the division of the IP address and/or the subscriber identity SI into two portions, and therefore also the determination of the subscriber identity SI from the IP address.

A known subscriber identity SI, which is standardised, is the international mobile station identity IMSI according to the ITU-T Recommendation E.212. The IMSI consists of a mobile country code MCC, which identifies uniquely a country of domicile of a mobile station, followed by a mobile network code MNC, which identifies uniquely a home public land mobile network of the mobile station, followed by a mobile station identification number MSIN, which identifies uniquely the mobile station within a public land mobile network. Only numerical characters are used in the IMSI. The maximum length of the IMSI is 15 digits.

A known IP address structure is the 32 bit IPv4 address structure. Such an address has a four octet format which is generally expressed in a dotted decimal point format, with each octet written as a decimal integer separated from other octets by decimal points (e.g. 193.154.180.123).

Global IP addresses are issued according to one of three commonly used classes. Class A IP addresses employ their first octet as a network identifier and their remaining three octets as a host identifier. Since three octets are available for specifying a particular host, by use of a Class A address $2^{24}$, or nearly 17 million, addresses are available for use with possible hosts. On the other hand, Class B IP addresses employ their first two octets to identify the network and their second two octets to identify a particular host. Thus, by use of Class B addresses, approximately 64,000 hosts can be identified. Finally, Class C IP addresses employ their first three octets to identify the network and their last octet to identify a host. Therefore, a single Class C network can provide 256 host addresses.

Figure 6:
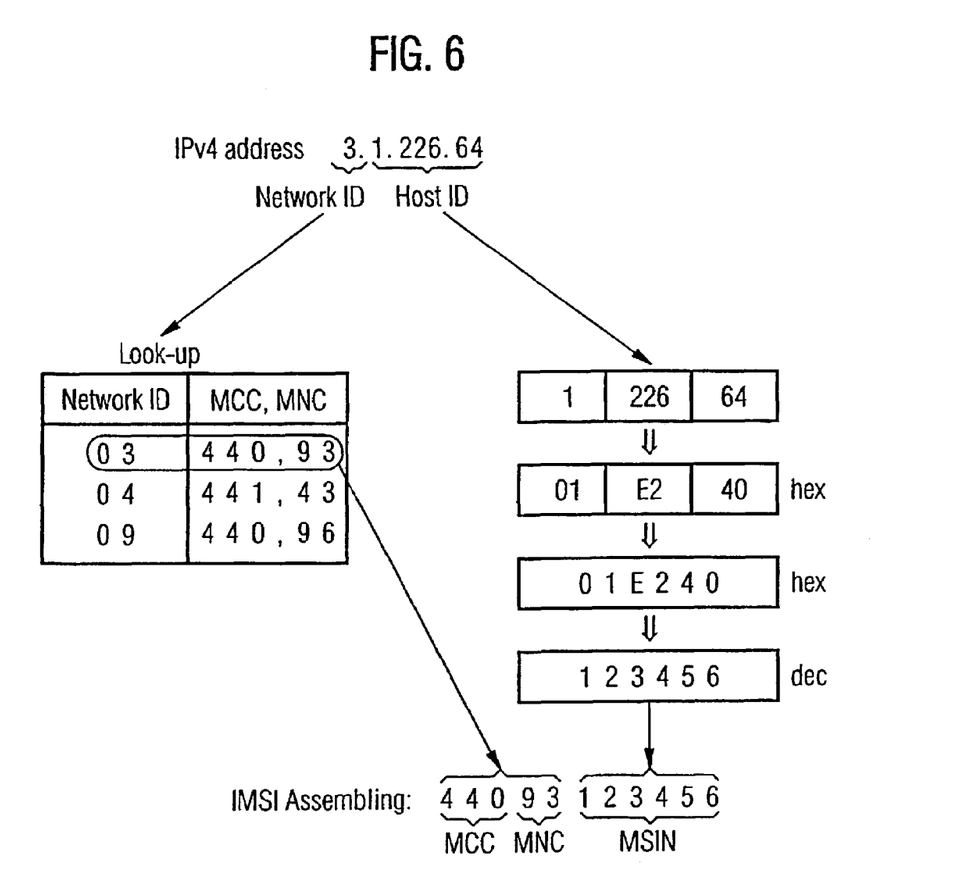
FIG. 6 illustrates a determination of an IMSI from a given IPv4 address.

FIG. 6 shows a determination of an IMSI from a given IPv4 address in a Class A format. A first portion of the given IP address is used for a look-up in a look-up table in order to retrieve a first portion of the IMSI. In a further step, a second portion of the IP address is assigned to a second portion of the IMSI.

In FIG. 6, a 32 bit, i.e. 4 byte, IPv4 address 3.1.226.64 is exemplary given to illustrate the determination of the corresponding IMSI. The first byte, respectively the first portion of the IP address, has the value 3 and represents the network identifier according to the Class A IP address type definition. The remaining three bytes, respectively the second portion of the IP address, have the values 1, 226 and 64 and represent the host identifier according to the Class A IP address type definition. The network identifier is used to look-up the MCC and MNC values, respectively the first portion of the IMSI, from a look-up table. For the given value 3 of the network identifier the lookup results according to the example shown in FIG. 6 in the value 44093 as the first portion of the IMSI.

If a Class A IPv4 address format is used, the look-up table can contains up to 256 different network identifiers and corresponding MCCs and MNCs. In practise, the number of entries might be lower because it reflects the number of operators connected to the communications system's IP network, the used numbering plan and the number of subscribers served by each operator. Considering an IP network shared between different operators, each operator has at least one entry of a network identifier in the look-up table. Each operator can have more than one entry, if the numbering plan for the IMSIs foresees more than one MCC per country, or in general, if a high number of subscribers are to be served.

A further step for the determination of the IMSI is the assignment of the host identifier, respectively the second portion of the IP address, to the MSIN, respectively the second portion of the IMSI. As shown in FIG. 6, each host identifier byte's value is converted to its hexadecimal representation. I.e., the value of the first host byte 1 corresponds to the hexadecimal value 1, the value of the second host byte 226 corresponds to the hexadecimal value E2, and the value of the third host byte 64 corresponds to the hexadecimal value 40. In their order of appearance, the hexadecimal byte values represent the hexadecimal value 1E240, which corresponds to the decimal value 123456. This value represents MSIN of the IMSI, or in other words, the second portion of the IMSI. Thus, the assembled IMSI reads as follows: 44093123456.

Although the present invention is especially useful for Class A IPv4 address types, it can be used as well with the IPv4 address formats Class B or Class C according to the operator's preferences. A person skilled in the art will recognise also the possibility to use the present invention with other, proprietary IP address structures, as well as with an address structure according to the classless interdomain routing (CIDR) architecture. The present invention can also be used, if a so-called subnetting of the IP address takes place, e.g. if the subnet identifier represents the first portion of the IP address. Subnetting allows a network to be split into several parts for internal use, wherein it still acts like a single network to the outside world. For Details about CIDR and subnets, reference is made to Andrew S. Tanenbaum, 'Computer Networks', Prentice Hall 1996, pp. 434437 and pp. 417419.

In a further preferred embodiment the subscriber identity SI corresponds to the mobile station integrated services digital network number MSISDN according to the ITU-T recommendation E.164. In this case, country code CC and national destination code NDC of the MSISDN represent the first portion of the subscriber identity SI. The second portion of the subscriber identity SI is represented by the subscriber number of the MSISDN.

In a further preferred embodiment of the present invention the push service providing host or an application server sends data packets by use of an IPv6 address type. IPv6 addresses are 128 bit in length. Therefore, a significantly increased number of different IP addresses is available with IPv6 compared to IPv4.

Operators with an IPv4 network can migrate their proprietary IP network into the international Internet if they reserve some part of the IPv6 address space for their purposes. The reservation is done, e.g., by a fixed prefix as a further portion of the IP address. Then, such a prefix supports the locating of the first and second portion of the IP address, that are necessary for the determination of the IMSI. The prefix itself is not necessary for the determination of the IMSI.

In order to ensure backward compatibility to the existing IPv4 addresses, e.g., an unicast subnet that allows for addresses with four host bytes can be reserved for such operators. In this case, the initial 12 bytes of the IPv6 address structure can be used for any addresses, but the trailing four bytes are reserved for the existing IPv4 addresses that are already assigned to subscribers.

As an example, the value 5500:0100:0000:0000:0000: 0000 is assigned as a prefix for backwards compatible networks. Then, the IPv4 address 3.1.226.64 as used above that belongs to the IMSI 44093123456 is coded as 5500: 0100:0000:0000:0000:0000:0301:E240 as IPv6 address.

Furthermore, IPv6 addresses are useful if more than one IP address shall be available per subscriber, like it is possible with UMTS, e.g., if more than one IP protocol stack is implemented in UMTS terminals. Although the same functionality can be provided by using IPv4 addresses, e.g. by the use of several top-level domains per subscriber, the proposed solution based on the IPv6 format is more convenient. The following example illustrates such an IPv6-based solution that allows for an IMSI in 9 bytes: The MCC is coded in two bytes, the MNC is coded in one byte and the MSIN is coded in 5 bytes. Such a coding allows for MSINs with 10 digits in length, which is the maximum that is allowed according to the ITU-T recommendation E.212. In this case, multiple IP addresses per subscriber can be supported by at least one trailing byte.

As an example, the 5500:000:000:00 is assigned as a prefix for all public land mobile networks. The IMSI consists of a MCC with the value 440=01 B8 hex, a MNC with the value 93=3F hex, and a 10 digit MSIN with the value 1234567890=00 49 96 02 D2 hex. One trailing byte is provided, which allows for 256 different IP addresses per subscriber. This results in an IPv6 address interval for a subscriber having the IMSI 440 93 1234567890 from 5500:0000:0000:0001:B83F:0049:9602:D200 to 5500:0000:0000:0001:B83F:0049:9602:D2FF.

In a further preferred embodiment of the present invention the described method is performed by software code portions of a computer program or a computer program product, which is loadable into the internal memory of a digital computer, when the program is executed on a computer. Such a computer can be located e.g. at the gateway node or at the address conversion node. Alternatively, the computer can be represented as a distributed system, capable of executing the program in a distributed manner. This can be done, e.g. if the computer uses a so-called network operation system for its internal functions, or in other words, if the distributed computer system uses a middleware.

Alternatively, the computer program can be executed also in an environment outside of the communications system, e.g. on a simulator or a test system. Also an implementation in a mobile station is possible.

In order to allow an easy portability between different computers, in a further preferred embodiment the computer program is stored on a computer usable medium like a floppy disk, a CD ROM or a chip card.

While in the above the present invention has been discussed with respect to specific IP address formats and subscriber identity formats, for a person skilled in the art it is evident that the use of any format of these addresses however defined may be considered within the framework of the present invention.

The invention claimed is:

1. A method for facilitating in a communications system a data transmission to a receiver, said receiver being identified in the communication system by a subscriber identity (SI), comprising the steps of:
   receiving a data packet;
   reading an Internet Protocol address of the data packet;
   determining a subscriber identity assigned to the Internet Protocol address; and
   initiating a delivery of payload information of the data packet to a receiver using the subscriber identity,
   wherein the determining of the subscriber identity further comprises the steps of:
   retrieving a first portion of the subscriber identity through a look-up using a first portion of the Internet Protocol address, and
   assigning a second portion of the Internet Protocol address to a second portion of the subscriber identity.

2. The method according to claim 1, wherein the subscriber identity (SI) comprises an International Mobile Subscriber Identity (IMSI).

3. The method according to claim 1, wherein the step of initiating the delivery further comprises the step of determining additional address information of the receiver using the subscriber identity.

4. The method according to claim 3, further comprising the step of:
   storing the Internet Protocol address and at least one of the subscriber identity and the additional address information for look-up in a buffer.

5. The method according to claim 4, further comprising the steps of:
   receiving at least one further data packet comprising the Internet Protocol address;
   reading, for each further data packet, an Internet Protocol address associated with the further data packet;
   retrieving for each further data packet at least one of the subscriber identity and the additional address information from the buffer using the Internet Protocol address; and
   initiating, for each further data packet a delivery of payload information of the further data packet to the receiver using at least one of the subscriber identity and the additional address information.

6. The method according to claim 1, wherein the Internet Protocol address is an IPv4 address.

7. The method according to claim 1, wherein the first portion of the Internet Protocol address is one of a network identifier and a subnet identifier, and wherein the second portion of the Internet Protocol address is a host identifier.

8. The method according to claim 6, wherein the IPv4 address is encoded in a Class A format.

9. The method according to claim 1, wherein the Internet Protocol address is an IPv6 address.

10. The method according to claim 1, wherein the subscriber identity comprises a mobile station integrated services digital network number (MSISDN).

11. A node in a communications system comprising:
    means for receiving a data packet;
    means for reading an Internet Protocol address of the data packet;
    means for determining a subscriber identity that is assigned to the Internet Protocol address; and
    means for initiating delivery of payload information of the data packet to a receiver using the subscriber identity, wherein the means for determining a subscriber identity further comprises: means for retrieving a first portion of the subscriber identity through a look-up using a first portion of the Internet Protocol address, and means for assigning a second portion of the Internet Protocol address to a second portion of the subscriber identity.

12. A communications system, comprising:
    a host for sending data packets;
    a gateway node in communication with the host;
    an IP network for transmission of data packets between at least two elements of the communications system;
    a receiver for receiving payload information of at least one data packet;
    a subscriber profile data base comprising subscriber profile data necessary for a determination of a current delivery address of the receiver; and
    an address conversion node, comprising a look-up table for at least a first portion of Internet Protocol addresses and a first portion of the subscriber identity, the gateway node further adapted to:
    receive a data packet from the host;
    read an Internet Protocol address of the data packet;
    receive, from the address conversion node, a subscriber identity assigned to the Internet Protocol address; and
    initiate delivery of payload information of the data packet to a receiver using the subscriber identity, wherein the subscriber identity is determined by the address conversion node by retrieving a first portion of the subscriber identity through a look-up using a first portion of the Internet Protocol address, and assigning a second portion of the Internet Protocol address to a second portion of the subscriber identity.

13. The communications system according to claim 12, further comprising:

a firewall connecting the host with a further network.

14. The communications system according to claim 12, wherein the host further comprises an application server.

15. The communications system according to claim 12, wherein the subscriber profile database further comprises the address conversion node.

16. The communications system according to claim 12, wherein the gateway node further comprises the address conversion node.

17. The communications system according to claim 12, wherein the communications system comprises a Packet Personal Digital Cellular system.

18. The communications system according to claim 12, wherein the communications system comprises a General Packet Radio Service system.

19. The communications system according to claim 12, wherein the communications system comprises a Universal Mobile Telecommunication System.

20. A computer readable medium for storing software code portions loadable into the internal memory of a digital computer, the digital computer, when loaded with the software code portions, operable to perform the steps of:

receiving a data packet;

reading an Internet Protocol address of the data packet;

determining a subscriber identity that is assigned to the Internet Protocol address; and initiating a delivery of payload information of the data packet to a receiver using the subscriber identity, wherein the subscriber identity is determined by retrieving a first portion of the subscriber identity through a look-up using a first portion of the Internet Protocol address, and assigning a second portion of the Internet Protocol address to a second portion of the subscriber identity.

21. The node of claim 11, wherein the initiating of delivery further includes determining additional address information of the receiver using the subscriber identity.

22. The node of claim 21, further adapted to:

store the Internet Protocol address and at least one of the subscriber identity and the additional address information for look-up in a buffer.

23. The node of claim 22, further adapted to:

receive at least one further data packet comprising the Internet Protocol address;

read an Internet Protocol address for each further data packet;

retrieve, for each further data packet, at least one of the subscriber identity and the further address information from the buffer using the Internet Protocol address; and initiate a delivery of payload information for each further data packet to the receiver using at least one of the subscriber identity and the additional address information.

24. The communications system of claim 12, wherein the initiating of delivery further includes determining additional address information of the receiver using the subscriber identity.

25. The communication system of claim 24, the gateway node further adapted to:

receive at least one further data packet comprising the Internet Protocol address;

read an Internet Protocol address for each further data packet;

retrieve, for each further data packet, at least one of the subscriber identity and the additional address information from the buffer using the Internet Protocol address; and initiate a delivery of payload information for each further data packet to the receiver by using at least one of the subscriber identity and the additional address information.

* * * * *